Sept. 6, 1960     H. R. BRANNON, JR     2,951,941
METHOD AND APPARATUS FOR PULSING A SCINTILLATION DETECTOR
Filed Jan. 7, 1957
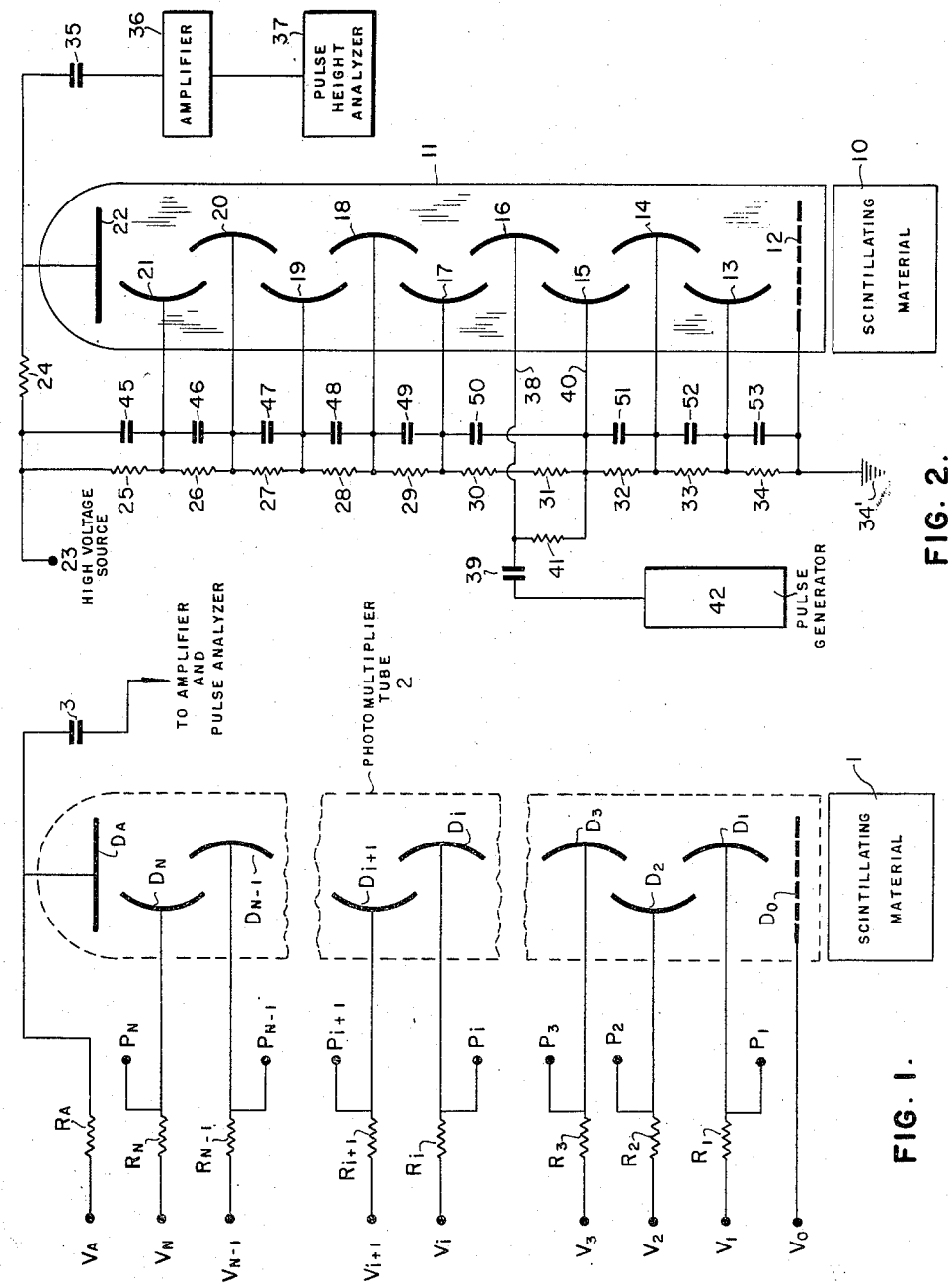
*INVENTOR.*
HEZZIE R. BRANNON JR.,
BY John S. Schneider
ATTORNEY

United States Patent Office 2,951,941
Patented Sept. 6, 1960

2,951,941

METHOD AND APPARATUS FOR PULSING A SCINTILLATION DETECTOR

Hezzie R. Brannon, Jr., Bellaire, Tex., assignor, by mesne assignments, to Jersey Production Research Company, Tulsa, Okla., a corporation of Delaware Filed Jan. 7, 1957, Ser. No. 632,703

4 Claims. (Cl. 250—71.5)

This invention concerns method and apparatus for pulsing a radiation detector on and off.

In certain radiation detection systems, it is desirable to turn the detector off and on for very short intervals of time. For example, in U.S. Application Serial No. 616,687, filed October 18, 1956, now abandoned, entitled "Method of Nuclear Borehole Logging" by Nils L. Muench and Hezzie R. Brannon, Jr., a method of borehole logging is described wherein subsurface formations are bombarded with primary radiation and the induced secondary radiation is detected to determine characteristics of the subsurface formations such as the presence and amounts of selected materials contained in the formation. In this method the source and detector are pulsed in order to differentiate between induced radiation resulting from reactions substantially early in the life of bombarding primary radiation from reactions later in the life of the bombarding primary radiation. The advantages of a pulsing system over a continuously operating system are fully discussed in the cited patent application. For the pulsing system to operate most efficiently it is necessary to turn the detector on and off in extremely short periods of time whether the detector is to be used in coincidence with the "on" periods of the source or is to be used out of coincidence therewith. Therefore, it is necessary that the switching on and off of the detector be performed at a position in the detector system where the pulses to be detected and counted are still of a short time duration compared to the "on" time of the detector.

In scintillation counter detection systems a phosphor or scintillating material, such as crystals of anthracene or stilbene adapted to translate incoming radiation such as gamma rays and neutrons into light rays, is positioned adjacent a photomultiplier. Some of the light rays emitted by the phosphor impinge on the photocathode of the photomultiplier and are converted into electrical pulses. A series of dynodes or anodes in the photomultiplier amplify the pulses in stages to obtain strong output electrical pulses from the photomultiplier. The output electrical pulses may then be amplified in a linear amplifier, analyzed by transmission through a discriminator (which only passes pulses of selected amplitudes) or an integrator (which averages out the pulses with respect to amplitude and frequency), or both, and recorded.

The method and apparatus to be described herein involves applying a voltage pulse to one or more selected dynode stages in the photomultiplier when it is desired to turn the detector on for counting. At all other times the voltage drop or potential across the selected dynode stage or stages is zero or negative, hence no signal is transmitted from the photomultiplier and the detector is turned off.

Thus, in the detection of gamma rays by pulsing stages of the photomultiplier the effective gamma ray pulse width involved is approximately 0.25 microseconds and if an "on" detection time of 5 microseconds is desired only $$\frac{0.25}{5.0} \cdot 100 = 5\%$$

of the gamma ray pulses are partially lost by turning the photomultiplier on or off. However, if pulsing of the detector is attempted at stages of amplication later than the photomultiplier, the effective gamma ray pulse width involved is approximately 4 microseconds and if an on time of 5 microseconds is desired about $\frac{4}{5} \times 100 = 80\%$ of the gamma ray pulses are partially lost by turning the detector or counter on or off.

Hence, one object of this invention is to provide a method and apparatus therefor permitting rapid turning on and turning off of a scintillation detector wherein the minimum on period consistent with conservation of the original spectrum of pulse heights generated by the scintillating material is as short as a few microseconds. Further objects of this invention are to provide a method and apparatus for switching on and off a scintillation detector in order to introduce a minimum of distortion of spectra generated by the scintillating material and to introduce negligible switching transients.

Briefly, my invention comprises a radiation detector system including a scintillating material adapted to emit light on interaction with radiation; a photoelectric device provided with a photocathode adapted to convert said light into electrical pulses and a plurality of dynodes adapted to amplify said pulses; means connected to said photoelectric device adapted to permit and prevent amplification of said pulses in said photoelectric device; analyzing means adapted to analyze the pulses transmitted from said photoelectric device and a source of voltage for energizing said system. The invention also encompasses a method of pulsing a radiation detector, comprising the steps of applying a positive potential difference to a selected "pair of dynodes" of a photomultiplier by means of a pulse generator to turn said detector on, and applying an approximately zero or a negative potential difference to said selected "pair of dynodes" to turn said detector off.

Fig. 1 is a schematic illustration of a general circuit according to my invention; and, Fig. 2 is a schematic representation of one embodiment of my invention and a circuit employed therewith.

Fig. 1 shows a photomultiplier tube 2 positioned adjacent to a scintillating or phosphor material 1. The various dynodes $D_1$, $D_2$, $D_3$, $D_i$, $D_{i+1}$, $D_{N-1}$, and $D_N$ are positioned within tube 2 between a photocathode $D_0$ and an anode $D_A$. The output of the anode $D_A$ is connected to a condenser 3 and an amplifier and suitable equipment for analyzing the pulses. The photocathode $D_0$, dynodes $D_1$, $D_2$, $D_3$, $D_i$, $D_{i+1}$, $D_{N-1}$, and $D_N$ and anode $D_A$ are connected to sources of D.C. potential designated $V_0$, $V_1$, $V_2$, $V_3$, etc. Dynodes $D_1$, $D_2$, $D_3$ etc. are also connected to a source of pulses designated respectively $P_1$, $P_2$, $P_3$ etc. A plurality of resistances $R_1$, $R_2$, $R_3$ etc. are connected between the potential sources and the dynodes as shown.

For continuous or conventional operation, the photomultiplier is "on" if: $V_{i+1}$ minus $V_i$ is greater than $V_n$ where $i$ equals 0, 1, 2 ... N and where $V_n$ denotes the potential required between dynodes for normal operation. For pulsing the photomultiplier on and off according to the invention, the photomultiplier is "on" if: $V_{i+1}$ minus $V_i$ is greater than $V_n$ and $V_{k+1}$ minus $V_k$ is less than $V_c$ where $k$ equals one or more values from 1 to N and $i$ equals 0, 1, 2 ... N but $i$ is not equal to $k$ and $V_c$ denotes the potential required between dynodes to render the photomultiplier inoperative. $P_{k+1}$ equals $V_n$ minus $V_c$ and $P_i$ equals 0 when $i$ is not equal to $k+1$. The photomultiplier is "off" if: $V_{i+1}$ minus $V_i$ is greater than $V_n$ where $i$ equals 0, 1, 2 ... N but $i$ is not equal to $k$ and $V_{k+1}$ minus $V_k$ is less than $V_c$ where $k$ equals one or more values from 0 to N. Also, $P_{k+1}$ equals 0 and $P_i$ equals 0 when $i$ is not equal to $k+1$. To serve best operation for those dynodes on which $P_i$ equals zero for all values of time, $R_i$ should also be made equal to zero. Thus, Fig. 1 represents the general application of the method and apparatus for pulsing the dynodes of a photomultiplier tube.

For a more specific pulsing application reference is now made to Fig. 2 wherein is shown a scintillating crystal 10 positioned adjacent a photomultiplier generally designated 11. The photomultiplier 11 is provided with a photocathode 12 and a plurality of dynodes 13—22.

Each of the dynodes is maintained at a higher potential than the next preceding one (and the photocathode) by means of a voltage divider circuit including a high voltage source 23 in series with a plurality of resistors 24 through 34 grounded as at 34'. The output anode 22 of the photomultiplier is connected in series to a condenser 35, a linear amplifier 36 and a pulse height analyzer 37, which latter may include a discriminator or integrator and a recorder or other pulse analyzing means.

A pulse generator 42 is connected to a "pair of dynodes" 15 and 16. For purposes herein "pair of dynodes" is defined as any two dynodes 13—21 and including photocathode 12. A lead 38 connects in series pulse generator 42, a condenser 39 and dynode 16 and a lead 40 connects in series lead 38, a resistor 41, the voltage divider circuit and dynode 15. A sufficient number of capacitors, such as capacitors 45 through 53 connected to the dynode leads, may be employed to insure that the voltage does not fluctuate during a pulse.

In operation, the detection system is turned on and off by application of a voltage potential difference or no potential difference, respectively, to a "pair of dynodes" of the photomultiplier. The voltage potential difference is applied to the "pair of dynodes" selected for gating by the pulse generator 42. In the particular circuit diagram, shown in the figure, the detector is in an operative state when the pulse generator output is positive (magnitude of approximately 40 to 100 volts) and is in an inoperative state when the pulse generator output is near zero or negative.

The pulse generator may be any desired type. For a discussion of pulse generators see, for example, G. N. Glasoe and J. V. Lebaeqz, Pulse Generators, MIT Radiation Lab. Series, vol. 5, McGraw-Hill Book Co., Inc., New York, 1948.

The switching occurs because of a property of the photomultiplier tube which provides that emission of electrons from a dynode $d_i$ is dependent upon emission of electrons from a dynode $d_{i-1}$ and the existence of a potential gradient such that $V_{di}$ is greater than $V_{di-1} + V_0$ where $V$ is the potential of a dynode and $V_0$ is a certain minimum potential difference between dynodes necessary to avoid extinction of the electron stream. $V_0$ is a property of a particular type of photomultiplier.

The time required to switch the detector on or off is limited only by the rise or decay time of the pulse generator. This time may be reduced to a fraction of a microsecond. The photomultiplier tube does not cause any switching delay since the time required for the photomultiplier to become operative or inoperative is essentially the transit time for an electron travelling from one dynode to another. This transit time may be of the order of $10^{-8}$ seconds.

The distortion of the gamma-ray spectrum generated by the scintillating material is reduced to a quantity that is essentially determined by the characteristics of the phosphor alone. In any event, it is small for detector "on" times as large as approximately 2 microseconds which is 10 times as large as the rise and decay time for an easily realizable switching pulse or 10 times the decay time of the phosphor, whichever is larger.

To illustrate the advantages of my system, let $\Delta t_1$ be the time required to turn the detector on or off, that is, the rise or decay time of the pulse generator, and let $\Delta t_2$ be the decay time of the scintillating material, that is, the time required for emission of all of the light generated by the scintillating material on absorption of a single energetic particle or ray. In practice, $\Delta t_1$ may be of the order of 0.1 to 0.01 microseconds. $\Delta t_2$ for a sodium iodide-thallium (NaI-Tl) crystal is about 0.25 microseconds. For anthracene, stilbene, etc. the $\Delta t_2$ time is substantially less than 0.25 microseconds. Thus, if a (NaI-Tl) detector is used, only those pulses that occur within times $2(\Delta t_1 + \Delta t_2) = 2(0.1 + 0.25) = 0.7$ microsecond will be distorted. This time interval could be reduced to about 0.5 microsecond for a (NaI-Tl) detector by use of a faster pulse generator. It is to be noted that even if an "on" time of $t=5$ microseconds is used, only $$\frac{2(\Delta t_1 + \Delta t_2)}{t + 2(\Delta t_1 + \Delta t_2)} \times 100 = \frac{0.7}{5.7} \times 100 = 12\%$$

of the pulses are distorted in amplitude. This is not a severe distortion and should be compared with a minimum value of about 35% which would be the case if, for example, the amplifier 36 were pulsed "on" and "off."

Thus, my invention has advantages over prior radiation detection systems since extremely short switch on and switch off times for the detector are possible. Also, a minimum distortion of spectra produced by the scintillating material occurs. Additionally, the switching transients are negligible.

Having fully described the nature, objects and operation of my invention, I claim:

1. In the detection of pulses of light a method for rendering a photomultiplier operable for extremely short time periods and inoperable at other time periods comprising applying selected potential differences to at least one pair of dynodes to render said photomultiplier operable, the minimum time duration of each of said operable time periods being substantially as short as the transit time of electrons between one pair of dynodes when the potential difference is applied to only one pair of dynodes and the minimum time duration of each of said operable time periods being substantially as short as the sum of the transit time of electrons between the first and last pairs of dynodes to which the potential differences are applied plus the transit time within said first and last pairs of dynodes when the potential differences are applied to more than one pair of dynodes and each of said operable time periods being selected so that each period includes the anticipated time of occurrence of said pulses of light it is desired to detect and excludes the anticipated time of occurrence of other pulses of light.

2. A method for detecting radiation comprising rendering a photomultiplier which is optically coupled to a scintillating means responsive to radiation incident upon said scintillating means during extremely short selected time periods and non-responsive to radiation at other time periods comprising applying selected potential differences to at least one pair of dynodes to render said photomultiplier radiation responsive, the minimum time duration of each of said responsive time periods being substantially as short as the transit time of electrons between one pair of dynodes when the potential difference is applied to only one pair of dynodes and the minimum time duration being substantially as short as the sum of the transit time of electrons between the first and last pairs of dynodes to which the potential differences are applied plus the transit time within said first and last pairs of dynodes when the potential differences are applied to more than one pair of dynodes and each of said responsive time periods being selected so that each period includes anticipated time of occurrences of pulses of light it is desired to detect and excludes the anticipated time of occurrence of other pulses of light resulting from absorption of radiation in said scintillating means.

3. A method for operating a radiation spectrometer including a photomultiplier comprising converting incoming radiation to be analyzed into light pulses, converting said light pulses into electrical pulses and amplifying said electrical pulses by means of said photomultiplier, applying selected potential differences across at least one pair of dynodes of said photomultiplier to pulse said photomultiplier on, the on period of said photomultiplier being selected such that it includes the anticipated time of occurrence of said light rays and excludes the anticipated time of occurrence of other pulses of light, the minimum on period of said photomultiplier being substantially as short as the transit time of electrons between one pair of dynodes when the potential difference is applied to only one pair of dynodes and the minimum on period of said photomultiplier being substantially as short as the sum of the transit times of electrons between the first and last pairs of dynodes to which the potential differences are applied plus the transit time within said first and last pairs of dynodes when the potential differences are applied to more than one pair of dynodes, and registering said amplified electrical pulses, the height of said electrical pulses being proportional to the energy of the incoming radiation converted to light pulses.

4. A method of well logging to ascertain characteristics of subsurface formations comprising irradiating said subsurface formations and detecting induced radiation resulting from said irradiation, said detection step including applying selected potential differences to at least one pair of dynodes of a photomultiplier to render it operable, the minimum time duration of each of said operable time periods being substantially as short as the transit time of electrons between one pair of dynodes when the potential difference is applied to only one pair of dynodes and the minimum time duration being substantially as short as the sum of the transit times of electrons between the first and last pairs of dynodes to which the potential differences are applied plus the transit time within said first and last pairs of dynodes when the potential differences are applied to more than one pair of dynodes and each of said operable time periods being selected so that each period includes the anticipated time of occurrence of said pulses of light it is desired to detect and excludes the anticipated time of occurrence of other pulses of light.

References Cited in the file of this patent

UNITED STATES PATENTS

| | | |
|---|---|---|
| 2,147,825 | Zworykin | Feb. 21, 1939 |
| 2,554,933 | Wouters | May 29, 1951 |
| 2,576,661 | Wouters | Nov. 27, 1951 |
| 2,625,653 | Wouters | Jan. 13, 1953 |
| 2,717,316 | Madey | Sept. 6, 1955 |
| 2,728,863 | Goodyear | Dec. 27, 1955 |
| 2,755,390 | Teichmann | July 17, 1956 |
| 2,758,217 | Scherbatskoy | Aug. 7, 1956 |
| 2,828,424 | Moe | Mar. 25, 1958 |